US009501292B2

United States Patent
Levy et al.

(10) Patent No.: US 9,501,292 B2
(45) Date of Patent: Nov. 22, 2016

(54) AUTOMATIC SLEEP MODE PREVENTION OF MOBILE DEVICE IN CAR HOLDER

(76) Inventors: Gil Levy, Tel Aviv (IL); Yaron Aizenbud, Haifa (IL)

(*) Notice: Subject to any disclaimer, the term of this patent is extended or adjusted under 35 U.S.C. 154(b) by 4 days.

(21) Appl. No.: 13/989,817

(22) PCT Filed: Nov. 30, 2011

(86) PCT No.: PCT/IB2011/055388
§ 371 (c)(1),
(2), (4) Date: Aug. 1, 2013

(87) PCT Pub. No.: WO2012/073204
PCT Pub. Date: Jun. 7, 2012

(65) Prior Publication Data
US 2013/0339720 A1    Dec. 19, 2013

Related U.S. Application Data

(60) Provisional application No. 61/417,997, filed on Nov. 30, 2010.

(51) Int. Cl.
| | |
|---|---|
| H04W 24/00 | (2009.01) |
| H04B 1/38 | (2015.01) |
| G06F 9/44 | (2006.01) |
| G08G 1/14 | (2006.01) |
| H04W 52/02 | (2009.01) |
| H04M 1/677 | (2006.01) |

(52) U.S. Cl.
CPC ............ *G06F 9/4421* (2013.01); *G08G 1/147* (2013.01); *H04W 52/027* (2013.01); *H04W 52/0254* (2013.01); *H04M 1/677* (2013.01); *H04M 2250/10* (2013.01)

(58) Field of Classification Search
CPC ..................... H04M 1/7253; H04M 2250/02
USPC ............... 455/573–574, 456.1, 456.3, 456.6
See application file for complete search history.

(56) References Cited

U.S. PATENT DOCUMENTS

| | | | |
|---|---|---|---|
| 6,523,124 B1* | 2/2003 | Lunsford et al. | 713/320 |
| 2008/0147321 A1* | 6/2008 | Howard et al. | 701/211 |
| 2009/0002147 A1* | 1/2009 | Bloebaum et al. | 340/466 |
| 2010/0081473 A1* | 4/2010 | Chatterjee | G06F 1/1632 455/559 |
| 2010/0216509 A1* | 8/2010 | Riemer | H04M 1/72577 455/557 |
| 2011/0099316 A1* | 4/2011 | Tseng et al. | 710/304 |
| 2011/0295458 A1* | 12/2011 | Halsey-Fenderson | B60K 28/10 701/29.1 |
| 2012/0040665 A1* | 2/2012 | Liu | H04W 4/008 455/426.1 |

* cited by examiner

*Primary Examiner* — Dung Hong
(74) *Attorney, Agent, or Firm* — Tutunjian & Bitetto, P.C.

(57) ABSTRACT

A mobile communications device includes at least one application programmer interface (API) to provide status information from components of the device, where the status information is indicative of the device being operated in an automobile, and a decision unit to modify at least one of screen backlighting and device locking in accordance with a driving state determined in accordance with at least the status information. A method for preventing sleep mode in a mobile communications device includes detecting active charging of the device, establishing that the device is in an automotive vehicle, based on the detecting and establishing, determining that a charging/vehicle state exists; and when the charging/vehicle state exists, instructing a screen backlight of the device to remain on, and disabling key locking for the mobile communications device.

12 Claims, 1 Drawing Sheet

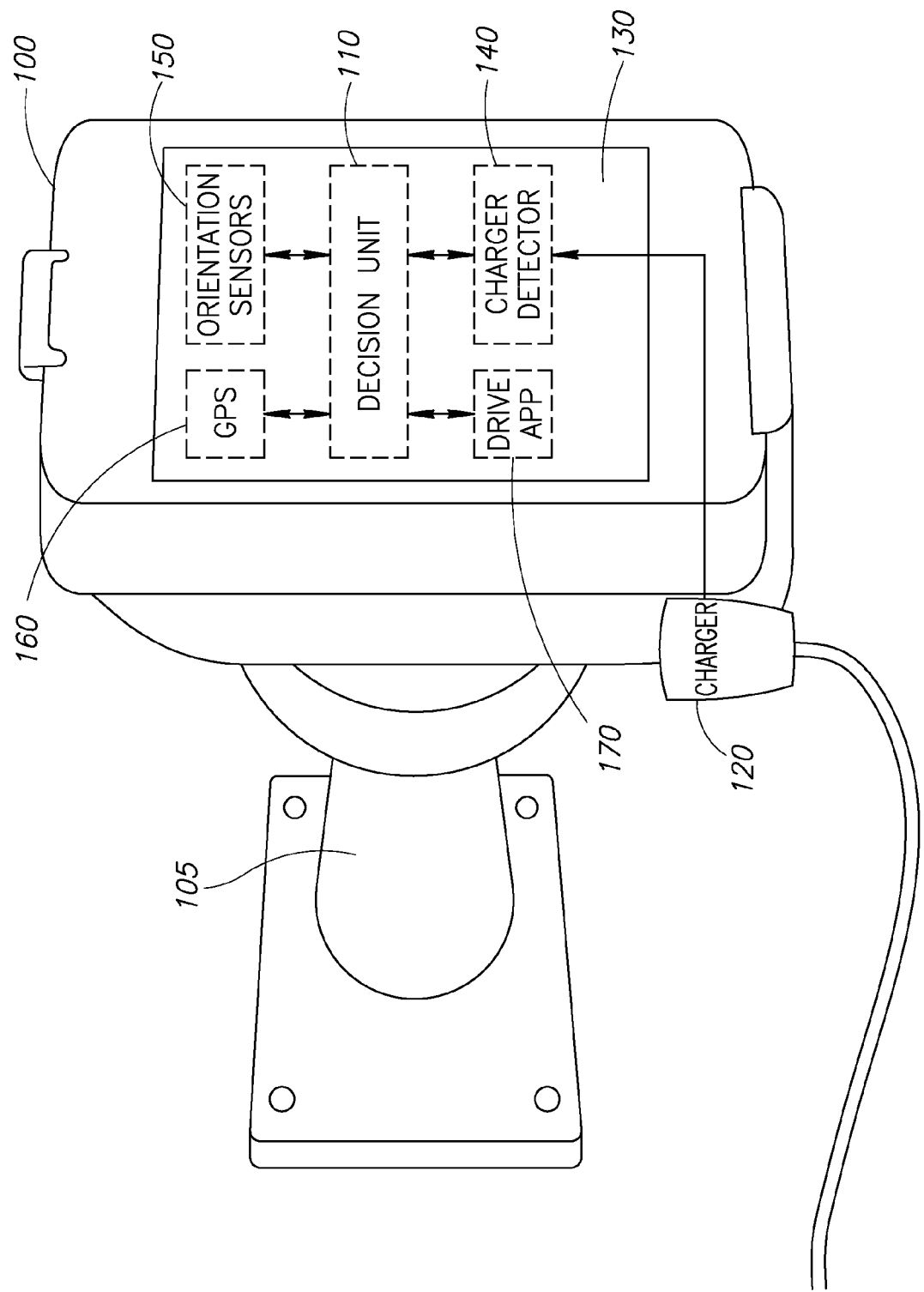

AUTOMATIC SLEEP MODE PREVENTION OF MOBILE DEVICE IN CAR HOLDER

CROSS-REFERENCE TO RELATED APPLICATIONS

This application is a national phase application of PCT International Application Number PCT/IB2011/05538, filed on Nov. 30, 2011, published as WO 2012/073204,which in turn claims priority and benefit from U.S. Provisional Patent Application No. 61/417,997, filed on Nov. 30, 2010, both of which are hereby incorporated by reference in their entirety.

FIELD OF THE INVENTION

The present invention relates to mobile devices generally and to their operating conditions when charging in particular.

BACKGROUND OF THE INVENTION

Vehicles are often equipped with a mounted phone cradle affixed to the dashboard. Such cradles are typically configured to hold a mounted mobile communications device in a generally upright manner facing the driver. When a mobile communications device is placed in such a stand, a driver may access it with relative convenience for a number of purposes including, for example, "hands free" phone usage, navigation, mp3 playing, etc.

For these purposes, it is generally more convenient for the driver if the screen backlight is constantly "on", such that the device may be operated with a minimum of delay without distracting the driver from the road any more than absolutely necessary. For the same reasons, it is also generally more convenient if the device is in an unlocked state when so mounted.

Unfortunately, as keeping the backlight on constantly consumes battery power, wastes energy and consequently shortens the battery life, most mobile communications devices are configured with a "sleep mode" that turns off the backlight when the device is not in active use. Keeping the device constantly unlocked is also problematic; it can result in undesired activation caused by touching the screen or unintentionally pressing buttons. For example, when a device is placed in a pocket, unintentional dialing and/or any other undesired operations performed unwittingly may result in unwanted expenses and/or privacy issues.

Mobile device users often charge their device's batteries while driving. There are a number of mechanisms available for using current from a vehicle's alternator to charge the battery of a mobile communications device while it is held by a phone cradle. For example, some phone cradles are configured to provide a connection between the alternator and the device held by the cradle. Alternatively, a device may be held by the phone cradle and its battery may be charged via a plug connection to an electric source such as, for example, the cigarette lighter.

SUMMARY OF THE PRESENT INVENTION

There is provided in accordance with a preferred embodiment of the present invention, a mobile communications device including a charger detector to detect when the device is charging, at least one orientation sensor to at least indicate a positional attitude for the device, where a persistent general upright attitude indicates that the device is in a phone cradle in a vehicle, and a decision unit to modify at least one of screen backlighting and device locking in accordance with a charge/cradle state determined in accordance with input from the charge detector and the at least one orientation sensor.

Further, in accordance with a preferred embodiment of the present invention, the at least one orientation sensor is at least one of: a gyro, an accelerometer and a magnetic orientometer.

Still further, in accordance with a preferred embodiment of the present invention, the device also includes a GPS unit to provide GPS data regarding a location of the device.

Additionally, in accordance with a preferred embodiment of the present invention, the decision unit is configurable to use the GPS data to determine if movement/location of the device is consistent with being inside the vehicle.

Moreover, in accordance with a preferred embodiment of the present invention, the decision unit is configurable to determine if the vehicle is one of moving and parking.

Further, in accordance with a preferred embodiment of the present invention, the also includes an application to be brought to the foreground when the charge/cradle state is determined.

Still further, in accordance with a preferred embodiment of the present invention, the device also includes at least one application programmer interface (API) to facilitate interaction between the decision unit and other software/hardware/firmware components installed on the device.

Additionally, in accordance with a preferred embodiment of the present invention, the components include at least one of a bluetooth car set device, a driving profile and hands free setting.

There is also provided, in accordance with a preferred embodiment of the present invention, a mobile communications device including a charger detector to detect when the device is charging, a GPS unit to provide GPS data indicative of whether the device is located in a vehicle, and a decision unit to modify at least one of screen backlighting and device locking in accordance with a charge/driving state determined in accordance with input from the charge detector and the GPS unit.

There is also provided, in accordance with a preferred embodiment of the present invention, a method for preventing sleep mode in a mobile communications device, including detecting active charging of the device, establishing that the device is in an automotive vehicle, based on the detecting and establishing, determining that a charging/vehicle state exists, and when the charging/vehicle state exists, instructing a screen backlight of the device to remain on, and disabling key locking for the mobile communications device.

Further, in accordance with a preferred embodiment of the present invention, the determining includes using input from an orientation sensor to determine that the device is in a generally upright position.

Still further, in accordance with a preferred embodiment of the present invention, the determining includes using GPS data from a GPS unit to determine that the location/movement of the device is consistent with a moving/parked vehicle.

Additionally, in accordance with a preferred embodiment of the present invention, the method also includes opening a default application in the foreground of the device when the charging/vehicle state exists.

Moreover, in accordance with a preferred embodiment of the present invention, the method also includes returning the screen backlight and key locking to a default state when the charging/vehicle state no longer exists.

There is also provided, in accordance with a preferred embodiment of the present invention, a mobile communications device including at least one application programmer interface (API) to provide status information from components of the device, where the status information is indicative of the device being operated in an automobile, and a decision unit to modify at least one of screen backlighting and device locking in accordance with a driving state determined in accordance with at least the status information.

Further, in accordance with a preferred embodiment of the present invention, the device includes at least one orientation sensor to at least indicate a positional attitude for the device, where a persistent general upright attitude indicates that the device is in a phone cradle in a vehicle.

Still further, in accordance with a preferred embodiment of the present invention, the device also includes a charger detector to detect when the device is charging.

Additionally, in accordance with a preferred embodiment of the present invention, the device also includes a GPS unit to provide GPS data indicative of whether the device is located in a vehicle.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 1 is a schematic illustration of a novel driving state detection and sleep mode prevention system, designed and operative in accordance with a preferred embodiment of the present invention.

It will be appreciated that for simplicity and clarity of illustration, elements shown in the FIGURES have not necessarily been drawn to scale. For example, the dimensions of some of the elements may be exaggerated relative to other elements for clarity. Further, where considered appropriate, reference numerals may be repeated among the FIGURES to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicants have realized that the fact that drivers may tend to charge their mobile communications devices in a phone cradle while driving may be leveraged to determine with reasonable accuracy when there may be a need to keep the device backlight on and prevent device locking. As will be disclosed hereinbelow, once this need may be determined, standard APIs application programming interfaces (APIs) may be employed to keep the backlight on and to maintain the device in an unlocked state.

Reference is now made to FIG. 1 which illustrates a novel driving state detection and sleep mode prevention system, designed and operative in accordance with a preferred embodiment of the present invention. Mobile communications device 100 may be held by phone cradle 105 which may be, for example, affixed to the dashboard of a car (not shown). Charger 120 may receive electrical input from the car by any suitable means.

Device 100 may comprise display screen 130, charger detector unit 140 and orientation sensor 150. Charger detector unit 140 may be any known functionality for detecting a connection between charger 120 and device 100. Orientation sensor may be one or more suitable functionalities such as are known in the art for detecting the orientation of device 100, for example, an accelerometer, gyro, magnetic orientometer such as, for example, a compass, etc. It will be appreciated that such functionalities may be routinely installed on mobile communications devices with a direct manipulation style of user interface.

Charger detector 140 may be configured to use known methods to detect the presence of charger 120 when it may be connected to device 100. When a connection to charger 120 may be detected, charger detector 140 may alert decision unit 110. Decision unit 110 may be configured to determine whether or not device 100 is in a cradle/charge state, i.e. whether or not device 100 is physically positioned in cradle 105 while charging.

After receiving the "charging alert" from charger detector 140, decision unit 110 may then sample input from orientation sensor 150 to determine whether or not device 100 may be in a generally upright position that may be generally consistent with being held by phone cradle 105. An exemplary rule for determining that device 100 may be in phone cradle 105 may be represented as: $DT_{1...N}=90+-E$, where "D" equals the attitude of device 100 as expressed by orientation sensor 150 in degrees, $DT_{1...N}$ represents a series of at least N samplings every T seconds, and "E" equals a pre-defined maximum angle adjustment in terms of degrees variance from 90 degrees. Accordingly, if the horizontal orientation of the device was 90+−E degrees for more than N times, decision unit 110 may infer that device 100 may be currently positioned in a vertical mode which may be consistent with it being positioned in phone cradle 105.

When decision unit 110 determines that device 100 may be in a cradle/charge state, it may employ standard known APIs to keep the backlight on for screen 130. Alternatively, decision 110 may use standard known APIs to turn off sleep mode, which may also include other functionalities not necessarily related to screen backlighting. Decision unit 110 may also disable phone locking.

It will be appreciated that charger detector 140 and orientation sensor 150 may continue to operate while backlighting/phone locking may be disabled. When charger detector 140 detects that charger 120 may no longer be connected, or when decision unit 110 determines (based on input from orientation sensor 150) that device 110 may no longer be in phone cradle 105, default functionality may be reengaged for backlighting and phone locking.

It will be appreciated that the ability to monitor the backlight of screen 130, have it turned on continuously and prevent device locking when in phone cradle 105 and while driving, may substantially enhance the safety of driving and maximize utilization of mobile communication device. The present invention may free the driver from the need to click on screen 130 in order to switch it on while driving. Similarly, a driver may no longer be required to unlock device 100 in order to make a phone call.

In accordance with a preferred embodiment of the present invention, APIs may be defined to facilitate interaction with decision unit 110 by other applications. For example, Applicant has realized that such APIs may enable the present invention to be extended to provide support for Bluetooth devices as well. Bluetooth devices may be used to facilitate "hands free" mode when driving by connecting device 100 to a mounted microphone and/or speaker. However, similar to screen backlighting, Bluetooth devices typically use relatively large amounts of battery power. Accordingly, decision unit 110 may be configured to use APIs to turn off Bluetooth devices when device 100 is not in a cradle/charge state Decision unit 110 may also use such APIs to adjust the modes and settings of device 100. For example, typical devices 100 may be configured with multiple usage profiles reflecting default or user selected preferences for use in given operating conditions. Typical examples of such profiles may include: "Normal", "Silent", "Driving", etc. Decision unit 110 may change the default profile to "Driving" whenever a cradle/charge state may be detected. Decision unit 110 may similarly initiate "hands free" operation for device 100 when it is in a cradle/charge state.

Applicants have also realized it may be convenient to execute a default application in the foreground whenever device 100 is in a cradle/charge state. In accordance with a preferred embodiment of the present invention, decision unit 110 may bring driving application 170 to the foreground whenever a cradle/charge state may be determined An exemplary driving application 170 may comprise a display platform for displaying a variety of relevant information while driving, such as car speed, traffic information, traffic camera alert, auto-opening navigation software etc. Accordingly, the present invention may facilitate interaction between the car and its driver—facilitating sending and receiving information from the car, process and display the information communicated and present useful information regarding the car systems.

Driving application 170 may also function as a specific "driving" screen, displaying common tasks used for driving. For example, it may be used to detect when a driver has vacated a parking space, or to activate a device camera for "hand gesture" operation mode. U.S. patent application Ser. No. 12/936762, entitled "System and method for identifying parking spaces for a community of users", assigned to the common assignees of the present invention and hereby incorporated in its entirety by reference, may disclose an example of parking space functionality that may be suitable for implementation within the context of driving application 170. Driving application 170 may also be used to activate the microphone for voice commands as well as for any other driving related tasks. It may also be used to receive information relevant to the specific location of the driver which might be useful to him/her.

Applicants have realized that some devices 100 may not be configured with orientation sensors 150. However, such devices may have GPS units 160. In accordance with an alternative preferred embodiment, decision unit 110 may use input from GPS unit 160 to determine whether or not device 100 is moving in a manner consistent with a moving vehicle. U.S. patent application Ser. No. 12/936762 may disclose a GPS based functionality for identifying movement consistent with a moving vehicle. U.S. patent application Ser. No. 12/936762 may also disclose a system for generating and/or accessing maps of known parking spaces in a given locale. Accordingly, decision unit 110 may use such functionality with input from GPS unit 160 regarding whether or not device 100 may be assumed to be in a moving or parked vehicle, thereby to determine whether a driving/charging state may exist instead of a cradle/charge state as in the previous embodiments. When a driving/charging state may be determined, decision unit 110 may respond in generally the same manner as if a cradle/charge state were determined It will be appreciated that regardless of whether or not device 100 may actually be charging, a generally upright positioning of device 100 may in any case still be indicative of a situation where it may be convenient for a user to keep the backlight on and/or disable key locking. For example, device 100 may be in cradle 105 but not charging. Alternatively, a user may have purposely propped up device 100 while using it, for example, to watch a streaming video. In such situations the user may prefer to keep the backlight on regardless of whether or not the device may be charging. Furthermore, a generally upright position may be indicative of charging in a cradle even if a charging process may not be explicitly detected. Therefore, in accordance with an alternative preferred embodiment of the present invention, decision unit 110 may be configured to prevent sleep mode whenever device 100 may be in an upright manner even if there may be no explicit indication of charging.

However, it will also be appreciated that there may be situations in which device 100 may be charging in a generally upright state even though it may not be mounted in a vehicle. For example, a user may charge a device 100 in a charging stand, or the device may coincidentally be propped up in a generally upright manner while charging. In such situations it may be preferable to leave the settings for backlighting and/or locking as per a default.

Therefore, in accordance with an alternative embodiment, input from GPS unit 160 may also be used in combination with input from orientation sensor 150 to determine whether or not device 100 may be in a cradle/charge state. As discussed hereinabove, the GPS based functionality of U.S. patent application Ser. No. 12/936762 may be employed to determine whether or not a device may be in a moving or parked vehicle. Decision unit 110 may receive input from such a system and/or GPS functionality to verify whether or not a detected cradle/charge state is also consistent with a moving or parked vehicle.

For example, the system and/or GPS functionality of U.S. patent application Ser. No. 12/936762 may indicate that device 100 is stationary in a non-parking spot. In such a situation, decision unit 110 may not keep backlighting on and/or disable locking even though it may have otherwise determined that device 100 was in a cradle/charge state. If, however, the indication is that device 100 is stationary in a known parking spot, decision unit 110 may "assume" that a detected cradle/charge state may be valid.

Similarly, the system of U.S. patent application Ser. No. 12/936762 may detect that while indeed device 100 may be moving, the movement may not be consistent with that of a driver operated automotive vehicle. For example, based on GPS input, it may be determined that device 100 may be moving along the known route of a train. In such a situation it may not be relevant to keep backlighting on and/or to disable locking.

Applicant has also realized that device 100 may be equipped with other functionalities that may be indicative of situations where it may be preferable to prevent sleep mode in device 100. For example, it may be preferable to prevent sleep mode whenever "hands free" mode is active and/or whenever the default profile may be "Driving". In accordance with another preferred embodiment of the present invention, decision unit 110 may keep the backlight on and/or disable locking whenever "hands free" mode and/or the "Driving" profile are detected. It will be appreciated that as disclosed hereinabove, device 100 may be configured with APIs that may provide such status information to device 100.

Unless specifically stated otherwise, as apparent from the preceding discussions, it is appreciated that, throughout the specification, discussions utilizing terms such as "processing," "computing," "calculating," "determining," or the like, refer to the action and/or processes of a computer, computing system, or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. Such a computer program may be stored in a computer readable storage medium, such as, but not limited to, any type of disk, including floppy disks, optical disks, magnetic-optical disks, read-only memories (ROMs), compact disc read-only memories (CD-ROMs), random access memories (RAMs), electrically programmable read-only memories (EPROMs), electrically erasable and programmable read only memories (EEPROMs), magnetic or optical cards, Flash memory, or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method performed by a mobile communication device comprising an at least one orientation sensor, the method comprising:
    detecting that the mobile communication device is being charged;
    determining that the mobile communication device is positioned in a persistent general upright attitude indicative the mobile communication device is in a phone cradle, wherein said determining is performed using input from the at least one orientation sensor;
    based on said determining, said detecting and based on GPS data obtained from a GPS unit of the mobile communication device, determining the mobile communication device is in a driving state, wherein the GPS data is indicative of a movement of the mobile communication device is consistent with being inside a driving vehicle; and
    in response to said determining the mobile communication device is in the driving state, modifying a device locking to prevent the mobile communication device from being locked as long as the mobile communication device is in the driving state.

2. The method of claim 1 further comprises in response to said determining the mobile communication device is in the driving state, instructing a screen backlight of the mobile communication device to remain on as long as the mobile communication device is in the driving state.

3. The method of claim 1 further comprises in response to said determining the mobile communication device is in the driving state, initiating a hands free mode of the mobile communication device, whereby enabling the hands free mode while the mobile communication device is in the driving state.

4. The method of claim 1 further comprises in response to said determining the mobile communication device is in the driving state, opening an application in a foreground of the mobile communication device, whereby in response to a determination that the mobile communication device is in a driving state, the application is opened in the foreground of the mobile communication device.

5. The method of claim 1, wherein the at least one orientation sensor at least one of: a gyro, an accelerometer and a magnetic orientometer.

6. A computer program product comprising a non-transient computer readable storage medium retaining program instructions, which program instructions when read by a processor, cause the processor to perform the method of claim 1.

7. A mobile communication device comprising:
    an at least one orientation sensor;
    a GPS unit; and
    a processor configured to:
        detect that the mobile communication device is being charged;
        determine that the mobile communication device is positioned in a persistent general upright attitude indicative the mobile communication device is in a phone cradle, wherein said determining is performed using input from said at least one orientation sensor;
        determine, based on the detection of the mobile communication device being charged and based on the determination that the mobile communication device is posited in a persistent general upright attitude indicative the mobile communication device is in a phone cradle and based on GPS data obtained from said GPS unit, that the mobile communication device is in a driving state, wherein the GPS data is indicative of a movement of the mobile communication device is consistent with being inside a driving vehicle; and
        in response to the determination that the mobile communication device being in the driving state, modify a device locking to prevent the mobile communication device from being locked as long as the mobile communication device is in the driving state.

8. The mobile communication device of claim 7, wherein said processor is further adapted, in response to the determination of the mobile communication device being in the driving state, to turning on a screen backlight of the mobile communication modify device and having the screen backlight remain on as long as the mobile communication device is in the driving state.

9. The mobile communication device of claim 7, wherein said processor is further adapted, in response to the determination of the mobile communication device being in the driving state, to disable key locking for the mobile communication device as long as the mobile communication device is in the driving state.

10. The mobile communication device of claim 7, wherein said processor is further adapted, in response to the determination of the mobile communication device being in the driving state, to initiate a hands free mode of the mobile communication device, whereby enabling the hands free mode while the mobile communication device is in the driving state.

11. The mobile communication device of claim 7, wherein said processor is further adapted, in response to the determination of the mobile communication device being in the driving state, to opening an application in a foreground of the mobile communication device.

12. A computer program product comprising a non-transitory computer readable storage medium retaining program instructions, which program instructions when read by a processor of a mobile communication device, cause the processor to perform a method comprising:

detecting that the mobile communication device is being charged;

determining that the mobile communication device is positioned in a persistent general upright attitude indicative the mobile communication device is in a phone cradle;

based on said determining, said detecting and based on GPS data obtained from a GPS unit of the mobile communication device, determining the mobile communication device is in a driving state, wherein the GPS data is indicative of a movement of the mobile communication device is consistent with being inside a driving vehicle; and in response to the determination that the mobile communication device being in the driving state, modifying a device locking to prevent the mobile communication device from being locked as long as the mobile communication device is in the driving state.

\* \* \* \* \*